(12) United States Patent
Silverbrook et al.

(10) Patent No.: US 7,533,031 B1
(45) Date of Patent: May 12, 2009

(54) METHOD AND SYSTEM FOR PROVIDING INSURANCE SERVICES

(75) Inventors: Kia Silverbrook, Balmain (AU); Jacqueline Anne Lapstun, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 764 days.

(21) Appl. No.: 09/693,690

(22) Filed: Oct. 20, 2000

(30) Foreign Application Priority Data

Oct. 25, 1999 (AU) .................................. PQ3632
Dec. 24, 1999 (AU) .................................. PQ4912

(51) Int. Cl.
*G06K 9/48* (2006.01)
*G06Q 40/00* (2006.01)

(52) U.S. Cl. .......................................... 705/4; 382/312

(58) Field of Classification Search ...................... 705/4
See application file for complete search history.

(56) References Cited

U.S. PATENT DOCUMENTS

| | | | | |
|---|---|---|---|---|
| 4,553,206 | A * | 11/1985 | Smutek et al. ............... | 707/101 |
| 4,616,854 | A * | 10/1986 | Landrum et al. .............. | 283/74 |
| 4,831,526 | A * | 5/1989 | Luchs et al. .................. | 705/4 |
| 4,864,618 | A | 9/1989 | Wright et al. | |
| 4,899,292 | A * | 2/1990 | Montagna et al. ........ | 707/104.1 |
| 5,051,736 | A | 9/1991 | Bennett et al. | |
| 5,226,091 | A | 7/1993 | Bridle et al. | |
| 5,446,653 | A * | 8/1995 | Miller et al. ................. | 705/4 |
| 5,477,012 | A * | 12/1995 | Sekendur ................. | 178/18.09 |
| 5,557,091 | A | 9/1996 | Krummel | |
| 5,652,412 | A | 7/1997 | Lazzouni | |
| 5,661,506 | A | 8/1997 | Lazzouni | |
| 5,692,073 | A * | 11/1997 | Cass .......................... | 382/219 |
| 5,737,740 | A * | 4/1998 | Henderson et al. .......... | 715/210 |
| 5,852,434 | A | 12/1998 | Sekendur | |
| 6,076,066 | A * | 6/2000 | DiRienzo et al. ............... | 705/4 |
| 6,076,734 | A * | 6/2000 | Dougherty et al. ..... | 235/462.01 |
| 6,272,528 | B1 * | 8/2001 | Cullen et al. ................... | 705/4 |
| 6,964,374 | B1 | 11/2005 | Djuknic et al. | |

FOREIGN PATENT DOCUMENTS

EP 0407734 A 1/1991

(Continued)

OTHER PUBLICATIONS

InsureMarket website printout packet (6 pages); retrieived from www.archive.org on May 13, 2005.*

(Continued)

*Primary Examiner*—C. Luke Gilligan
*Assistant Examiner*—Rachel L Porter

(57) ABSTRACT

The invention concerns a method and system for providing insurance. Employing the invention involves the use of one or more forms capable of interacting with a computer system or network, each form comprising sheet material such as paper which has coded data printed on it and which allows it to interact with the computer system by use of a sensing device operated by a user. The invention can be employed by an insurance provider to allow it to deal with a customer in offering a broad range of services including providing the facility to obtain information about insurance products, insurance quotes, and to make insurance claims and payments, and to enter into new policies with customers.

36 Claims, 26 Drawing Sheets

FOREIGN PATENT DOCUMENTS

| | | |
|---|---|---|
| GB | 2306669 | 5/1997 |
| JP | 09-128137 | 5/1997 |
| JP | 11184952 | 7/1999 |
| WO | WO 99/18487 | 4/1999 |
| WO | WO 99/19823 A | 4/1999 |
| WO | WO 99/50787 | 10/1999 |
| WO | WO 99/66441 | 12/1999 |

OTHER PUBLICATIONS

Dymetman, M., and Copperman, M., Intelligent Paper; in Electronic Publishing, Artistic Imaging, and Digital Typography, Proceedings of EP '98, Mar./Apr. 1998, Springer Verlag LNCS 1375, pp. 392-406.

* cited by examiner

HOUSE INSURANCE POLICY DETAILS

DATE & TIME | PAGE 1 OF #

PRODUCT NAME  POLICY NBR  POLICY NBR

POLICY HOLDER: NAME

POLICY START: START   RENEWAL DUE: RENEW

ADDRESS OF PROPERTY: ADDRESS

DWELLING TYPE: DWELLING TYPE

DWELLING USE: DWELLING USE

FEATURES: PROPERTY FEATURE

EXTRA COVERAGE: EXTRA COVERAGE ITEM

DEDUCTIBLE: DEDUCTIBLE

INSURED VALUE: INSURED VALUE

INSURANCE PREMIUM: PREMIUM

544 VIEW POLICY TERMS

546 MAKE A CLAIM   545 RENEW POLICY

HOUSE INSURANCE QUOTE REQUEST   PAGE 1 OF 1
DWELLING INFORMATION           TRAN NBR

TYPE OF DWELLING
- ☐ BRICK HOUSE      ☐ CONDOMINIUM
- ☐ TIMBER HOUSE     ☐ MOBILE HOME

DWELLING USE
- ☐ OWNER OCCUPIED
- ☐ RENTED

FEATURES OF DWELLING
- ☐ DEADBOLT LOCKS   ☐ SMOKE / FIRE ALARM
- ☐ SECURITY SYSTEM  ☐ FIRE EXTINGUISHER

ZIP CODE OF DWELLING [ZIP CODE]

VALUE OF DWELLING [INSURED VALUE]

549

550 ( RESET FORM )          551 ( CONTINUE )

FIG. 24

HOUSE INSURANCE QUOTE REQUEST  PAGE 1 OF 1
POLICY OPTIONS                  TRAN NBR

EXTRA COVERAGE REQUIRED
  ☐ EARTHQUAKE      ☐ FLOOD COVERAGE
    COVERAGE

DEDUCTIBLE
  ☐ $50             ☐ $500
  ☐ $100            ☐ $1000

PLEASE GIVE DETAILS OF ANY PREVIOUS CLAIMS          530

CLAIM HISTORY DESCRIPTION

CLAIM HISTORY DESCRIPTION 552    562     (CONTINUE OVER PAGE IF NECESSARY)
   RESET FORM        553  REQUEST QUOTE

FIG. 25

HOUSE INSURANCE QUOTE | DATE & TIME | PAGE 1 OF #
TRAN NBR

QUOTE NBR — QUOTE NBR

DWELLING TYPE — DWELLING TYPE

DWELLING USE — DWELLING USE

ZIP CODE OF DWELLING — ZIP CODE

FEATURES — PROPERTY FEATURE

⋮

PROPERTY FEATURE

EXTRA COVERAGE — EXTRA COVERAGE ITEM

DEDUCTIBLE — DEDUCTIBLE

INSURED VALUE — INSURED VALUE

INSURANCE PREMIUM — PREMIUM

QUOTE VALID UNTIL — QUOTE EXPIRY ( VIEW POLICY TERMS ) 554

TO ACCEPT THIS QUOTATION AND APPLY FOR INSURANCE, SIGN BELOW AND PRESS <ACCEPT QUOTE>.

SIGNATURE — SIGNATURE        ( ACCEPT QUOTE ) 555

541

( NEW QUOTE ) 556

FIG. 26

PURCHASE HOUSE INSURANCE  DATE TIME

QUOTE NBR — QUOTE NBR
INSURED VALUE — INSURED VALUE
INSURANCE PREMIUM — PREMIUM
ADDRESS OF PROPERTY — ADDRESS

SELECT ONE, OR ENTER NEW PAYMENT CARD

CARDHOLDER NAME    EXPIRY
☐ CARD NAME & ACCT    EXPIRY
☐ CARD NAME & ACCT    EXPIRY

NEW PAYMENT CARD
CARDHOLDER NAME  CARD NAME & ACCT
EXPIRY  EXPIRY
CARD TYPE
☐ VISA    ☐ DISCOVER
☐ MASTERCARD    ☐ JCB
☐ AMERICAN EXPRESS

557

TOTAL CHARGE  PREMIUM
AUTHORISING SIGNATURE  SIGNATURE 558
( PAY NOW )

FIG. 27

HOUSE INSURANCE POLICY DETAILS & RECEIPT    DATE & TIME   PAGE 1 OF #

PRODUCT NAME    POLICY NBR  POLICY NBR

POLICY HOLDER   NAME
POLICY START    START    RENEWAL DUE    RENEW
ADDRESS OF PROPERTY    ADDRESS

DWELLING TYPE   DWELLING TYPE
DWELLING USE    DWELLING USE
FEATURES    PROPERTY FEATURE
EXTRA COVERAGE    EXTRA COVERAGE ITEM
DEDUCTIBLE    DEDUCTIBLE
INSURED VALUE    INSURED VALUE
INSURANCE PREMIUM    PREMIUM

RECEIPT NUMBER    AUTH. NBR

559

VIEW POLICY TERMS

FIG. 28

METHOD AND SYSTEM FOR PROVIDING INSURANCE SERVICES

FIELD OF INVENTION

The present invention relates generally to the provision of insurance services and more specifically to methods and systems for providing insurance services using distributed computing systems. It has specific application to the operation of a computer system involving a printed form-based user interface.

CO-PENDING APPLICATIONS

Various methods, systems and apparatus relating to the present invention are disclosed in the following co-pending applications/granted patents filed by the applicant or assignee of the present invention simultaneously with the present invention:

09/693,415 7,110,126 6,813,558 6,965,454 6,847,883 09/693,647 09/693,690 6,982,798 6,474,888 6,627,870 6,724,374 09/693,514 6,454,482 6,808,330 6,527,365 6,474,773 6,550,997

The disclosures of these co-pending applications are incorporated herein by cross-reference.

Various methods, systems and apparatus relating to the present invention are disclosed in the following co-pending applications/granted patents filed by the applicant or assignee of the present invention on Sep. 15, 2000:

6,679,420 6,963,845 6,995,859 6,720,985

The disclosures of these co-pending applications are incorporated herein by cross-reference.

Various methods, systems and apparatus relating to the present invention are disclosed in the following co-pending applications/granted patents filed by the applicant or assignee of the present invention on Jun. 30, 2000:

6,824,044 6,678,499 6,976,220 6,976,035 6,766,942 09/609,303 6,922,779 6,978,019 09/607,843 6,959,298 6,973,450 09/609,553 6,965,882 09/608,022 7,007,851 6,957,921 6,457,883 6,831,682 6,977,751 6,398,332 6,394,573 6,622,923

The disclosures of these co-pending applications are incorporated herein by cross-reference.

Various methods, systems and apparatus relating to the present invention are disclosed in the following co-pending applications/granted patents filed by the applicant or assignee of the present invention on 23 May 2000:

6,428,133 6,526,658 6,338,548 6,540,319 6,328,431 6,328,425 6,991,320 6,383,833 6,464,332 6,390,591 7,018,016 6,328,417 09/575,197 7,079,712 09/575,123 6,825,945 09/575,165 6,813,039 6,987,506 7,038,797 6,980,318 6,816,274 7,102,772 09/575,186 6,681,045 6,728,000 09/575,145 7,088,459 09/575,181 7,068,382 7,062,651 6,789,194 6,789,191 6,644,642 6,502,614 6,622,999 6,669,385 6,549,935 6,987,573 6,727,996 6,591,884 6,439,706 6,760,119 09/575,198 6,290,349 6,428,155 6,785,016 6,870,966 6,822,639 6,737,591 7,055,739 09/575,129 6,830,196 6,832,717 6,957,768 09/575,162 09/575,172 09/575,170 7,106,888 09/575,161 6,409,323 6,281,912 6,604,810 6,318,920 6,488,422 6,795,215 09/575,109 6,859,289

BACKGROUND

Traditionally, insurance services have been provided using written documentation. This documentation typically has included information brochures, written quotes, policies and other documentation to enable an insurance provider to enter a contractual arrangement with a customer.

In more recent times, insurance providers have made some of this documentation available over networks such as the Internet and also insurance providers have made available options for paying policies electronically.

SUMMARY OF INVENTION

It is an objective of the present invention to provide a method and system for providing insurance services In a first aspect, the present invention provides a method of providing insurance services, the method including the steps of printing on demand on a surface, a form containing information relating to an insurance service, and at the same time as printing the information, printing on the surface coded data indicative of an identity of the form and of at least one reference point of the form;

receiving, in a computer system, indicating data from a sensing device regarding the identity of the form and a position of the sensing device relative to the form, the sensing device, when placed in an operative position relative to the form, sensing the indicating data using at least some of the coded date; and identifying, in the computer system and from the indicating data, at least one parameter relating to the insurance service.

In a second aspect, the present invention provides a method of providing insurance services, the method including the steps of printing on demand on a surface, a form containing information relating to an insurance service, and at the same time as printing the information, printing on the surface coded data indicative of at least one parameter of the insurance service;

receiving, in a computer system, data from a sensing device regarding the at least one parameter and regarding movement of the sensing device relative to the form, the sensing device, when moved relative to the form, sensing the data regarding the at least one parameter using at least some of the coded data and generating the data regarding its own movement relative to the form; and interpreting, in the computer system, the movement of the sensing device as it relates to the at least one parameter.

In a third aspect, the present invention provides a method of providing insurance services, the method including the steps of printing on demand on a surface, a form including coded data indicative of an identity of the form;

receiving, in a computer system, data from a sensing device regarding an identity of a customer and regarding the identity of the form, the sensing device containing the data regarding the identity of the customer and sensing the data regarding the identity of the form using at least some of the coded data; and identifying, in the computer system and from the data regarding the identity of the customer and the identity of the form, an insurance service.

In a fourth aspect, the present invention provides a system for providing insurance services, the system including a form printed on the surface, the form containing information relating to an insurance service, the form including coded data indicative of an identity of the form and of at least one reference point of the form; and a printer operative to print on demand the form by printing on the surface the information and at the same time the coded data; and a computer system for receiving indicating data from a sensing device for identifying at least one parameter relating to the insurance service, the indicating data being indicative of the identity of the form and a position of the sensing device relative to the form, the sensing device sensing the indicating data using at least some of the coded data.

In a fifth aspect, the present invention provides a system for providing insurance services, the system including a form printed on the surface, the form containing information relating to an insurance service, the form including coded data indicative of at least one parameter of the insurance service;

a printer operative to print on demand the form by printing on the surface the information and at the same time the coded data; and a computer system for receiving data from a sensing device, regarding the at least one parameter and regarding movement of the sensing device relative to the form, and for interpreting the movement of the sensing device as it relates to the at least one parameter, the sensing device, when moved relative to the form, sensing the data regarding the at least one parameter using at least some of the coded data and generating the data regarding its own movement relative to the form.

In a sixth aspect, the present invention provides a system for providing insurance services, the system including a form printed on the surface, the form including coded data indicative of an identity of the form; and a printer operative to print on demand the form by printing on the surface, the coded data; and a computer system for receiving from a sensing device, data regarding an identity of a customer and the identity of the form, and for identifying, from the received data, an insurance service, the sensing device containing the data regarding the identity of the customer and sensing the data regarding the identity of the form using at least some of the coded data.

Accordingly, the present invention provides a method and system which utilizes one or more forms capable of interacting with a computer system. Whilst the novel method and system of the present invention may be used in conjunction with a single computer system, in a particularly preferred form it is designed to operate over a computer network, such as the Internet.

BRIEF DESCRIPTION OF DRAWINGS

Preferred and other embodiments of the invention will now be described, by way of non-limiting example only, with reference to the accompanying drawings, in which:

FIG. 5c is a plan view showing an arrangement of nine of the tags shown in FIG. 5a where targets are shared between adjacent tags;

FIG. 5d is a plan view showing the interleaving and rotation of the symbols of the four codewords of the tag shown in FIG. 5a;

FIG. 23 is a schematic view of policy details;

FIG. 24 is a schematic view of a quote request—dwelling information;

FIG. 25 is a schematic view of quote request—policy options;

FIG. 26 is a schematic view of house insurance quote;

FIG. 27 is a schematic view of an insurance purchase form; and

FIG. 28 is a schematic view of a policy in receipt.

DETAILED DESCRIPTION OF PREFERRED AND OTHER EMBODIMENTS

Note: Memjet™ is a trademark of Silverbrook Research Pty Ltd, Australia.

In the preferred embodiment, the invention is configured to work with the netpage networked computer system, a summary of which is given below and a detailed description of which is given in our earlier applications, including in particular those applications U.S. Ser. No. 09/575,129, U.S. Ser. No. 09/575,174, U.S. Pat. No. 6,727,996 and U.S. Ser. No. 09/575,195. It will be appreciated that not every implementation will necessarily embody all or even most of the specific details and extensions described in these applications in relation to the basic system. However, the system is described in its most complete form to assist in understanding the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper or other media, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

Figure 1:
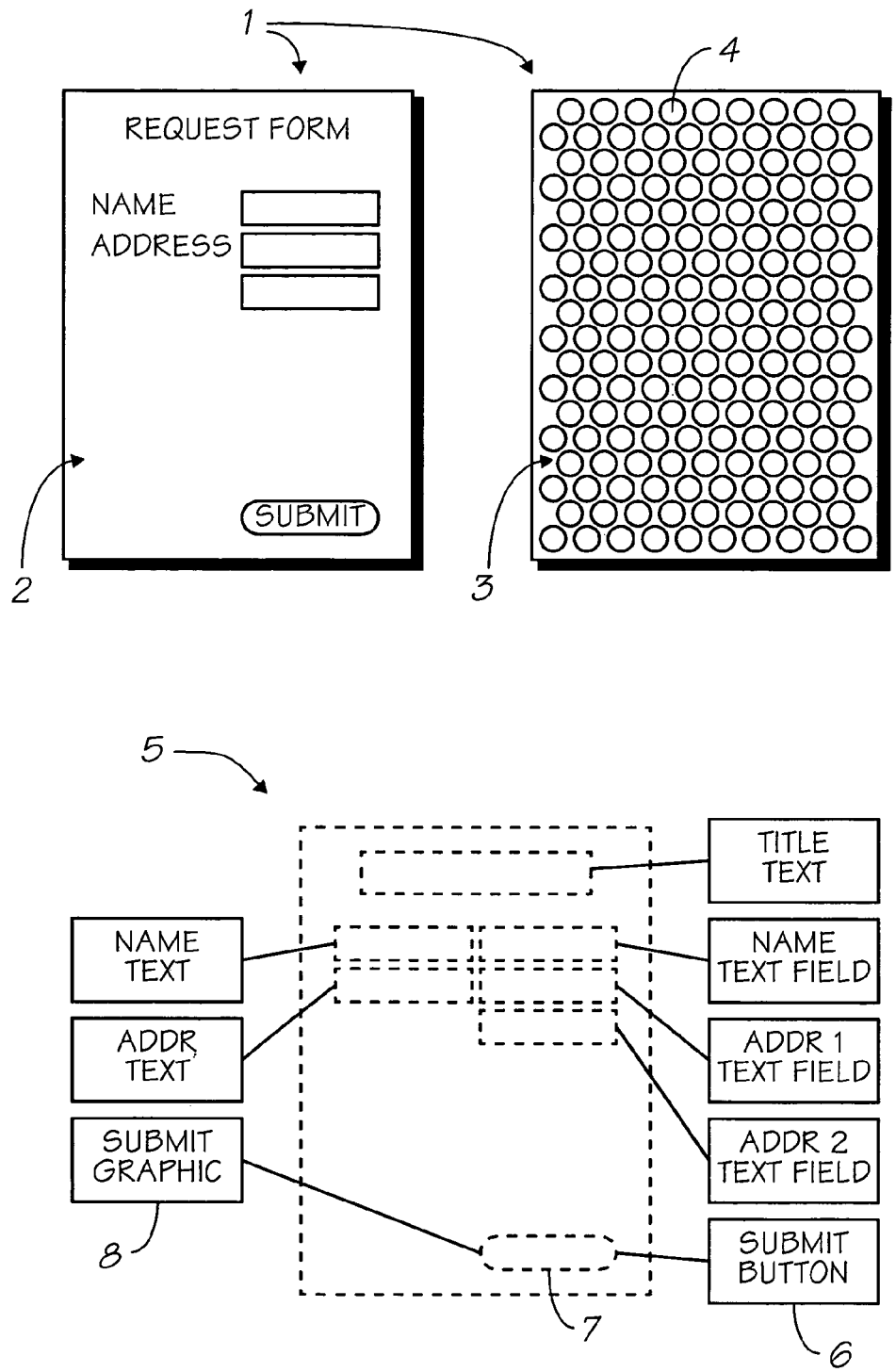
FIG. 1 is a schematic of a the relationship between a sample printed netpage and its online page description.

As illustrated in FIG. 1, a printed netpage 1 can represent a interactive form which is filled in by the user physically, on the printed page. This physical interaction with the page is communicated electronically by the pen, to the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
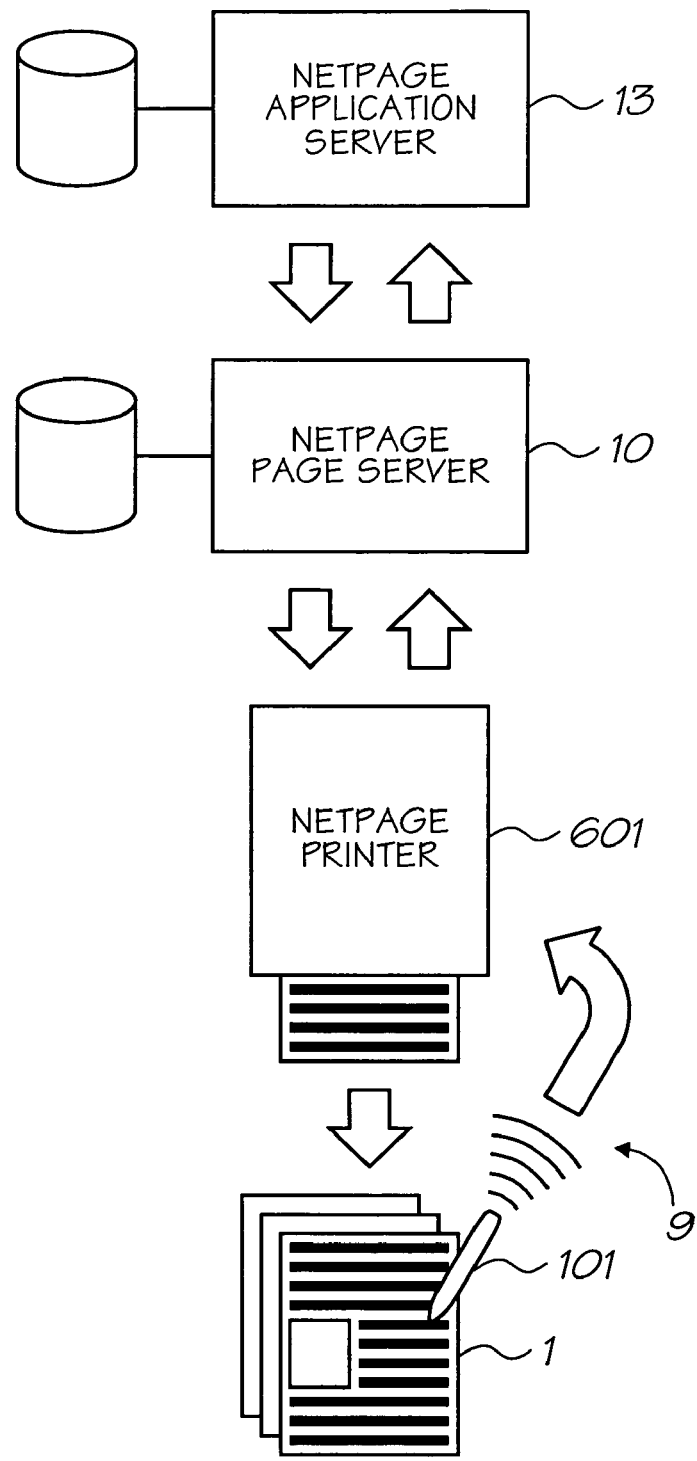
FIG. 2 is a schematic view of a interaction between a netpage pen, a netpage printer, a netpage page server, and a netpage application server.

As illustrated in FIG. 2, the netpage pen 101, a preferred form of which is described in our earlier application U.S. Ser. No. 09/575,174, works in conjunction with a netpage printer 601, an Internet-connected printing appliance for home, office or mobile use. The pen is wireless and communicates securely with the netpage printer via a short-range radio link 9.

The netpage printer 601, preferred forms of which are described in our earlier application U.S. Pat. No. 6,727,996 and our co-filed application U.S. Ser. No. 09/693,574, is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

Netpages printed at their point of consumption combine the ease-of-use of paper with the timelines and interactivity of an interactive medium.

As shown in FIG. 2, the netpage pen 101 interacts with the coded data on a printed netpage 1 and communicates, via a short-range radio link 9, the interaction to a netpage printer. The printer 601 sends the interaction to the relevant netpage page server 10 for interpretation. In appropriate circumstances, the page server sends a corresponding message to application computer software running on a netpage application server 13. The application server may in turn send a response which is printed on the originating printer.

The netpage system is made considerably more convenient in the preferred embodiment by being used in conjunction with high-speed microelectromechanical system (MEMS) based inkjet (Memjet™) printers, described in our earlier applications U.S. Pat. No. 6,428,133, U.S. Pat. No. 6,526, 658, U.S. Pat. No. 6,315,699, U.S. Pat. No. 6,338,548, U.S. Pat. No. 6,540,319, U.S. Pat. No. 6,328,431, U.S. Pat. No. 6,328,425, U.S. Ser. No. 09/575,127, U.S. Pat. No. 6,383, 833, U.S. Pat. No. 6,464,332, U.S. Pat. No. 6,370,591, U.S. Ser. No. 09/575,152 and U.S. Ser. No. 09/575,176. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

The netpage printer exploits the growing availability of broadband Internet access. The netpage printer can also operate with slower connections, but with longer delivery times and lower image quality. The netpage system can also be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer.

Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server.

A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or e-mail address.

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled. An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line. A generalization relationship ("is-a") is drawn as a solid line joining two classes, with an arrow (in the form of an open triangle) at the generalization end. When a class diagram is broken up into multiple diagrams, any class which is duplicated is shown with a dashed outline in all but the main diagram which defines it. It is shown with attributes only where it is defined.

Netpages are the foundation on which a netpage network is built. They provide a paper-based user interface to published information and interactive services. A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 3:
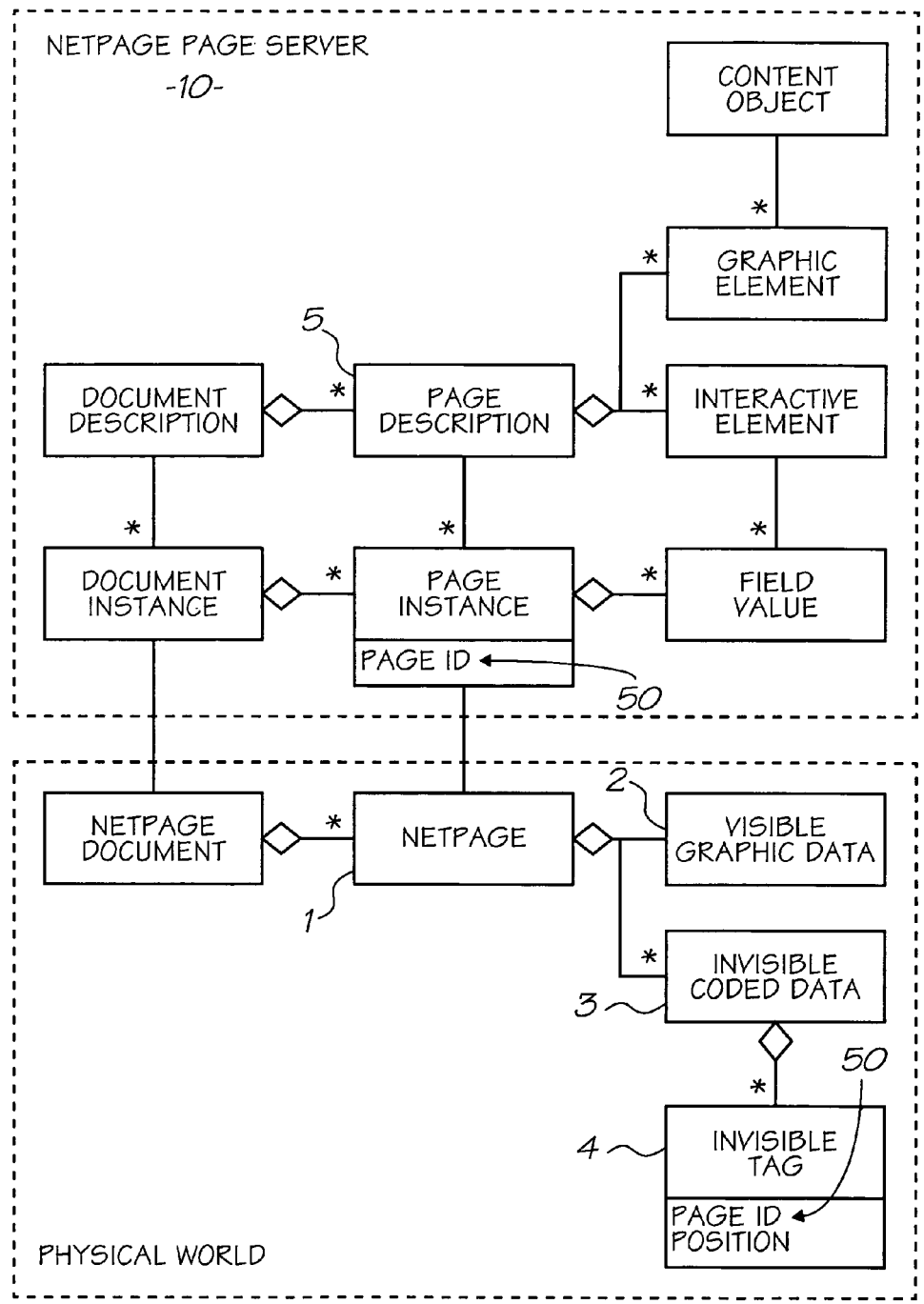
FIG. 3 is a schematic view of a high-level structure of a printed netpage and its online page description.

The relationship between the page description, the page instance, and the printed netpage is shown in FIG. 3. The printed netpage may be part of a printed netpage document 45. The page instance is associated with both the netpage printer which printed it and, if known, the netpage user who requested it.

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

In a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

Each tag contains typically contains 16 bits of tag ID, at least 90 bits of region ID, and a number of flag bits. Assuming a maximum tag density of 64 per square inch, a 16-bit tag ID supports a region size of up to 1024 square inches. Larger regions can be mapped continuously without increasing the tag ID precision simply by using abutting regions and maps. The distinction between a region ID and a tag ID is mostly one of convenience. For most purposes the concatenation of the two can be considered as a globally unique tag ID. Conversely, it may also be convenient to introduce structure into the tag ID, for example to define the x and y coordinates of the tag. A 90-bit region ID allows $2^{90}$ (~$10^{27}$ or a thousand trillion trillion) different regions to be uniquely identified. Tags may also contain type information, and a region may be tagged with a mixture of tag types. For example, a region may be tagged with one set of tags encoding x coordinates and another set, interleaved with the first, encoding y coordinates.

In one embodiment, 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword. Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code code can be used in place of a (15, 5) Reed-Solomon code, for example a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by cross-reference).

Figure 4A:
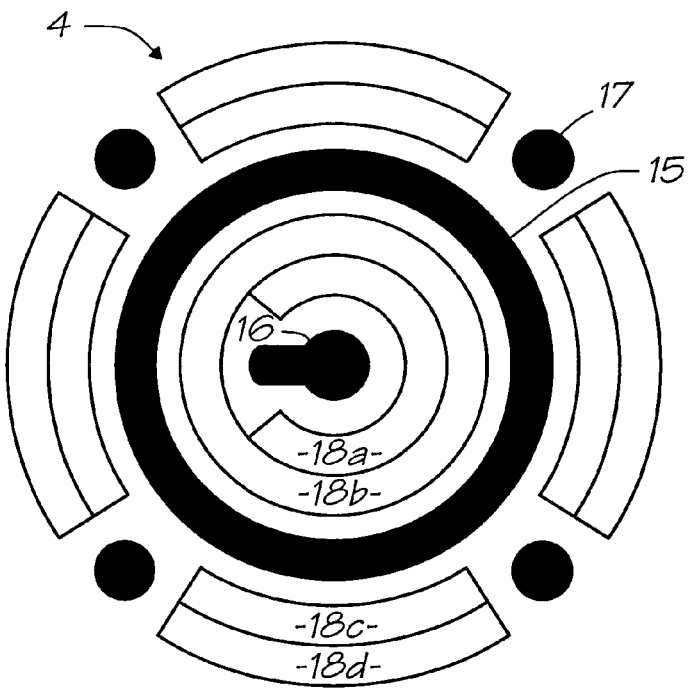
FIG. 4a is a plan view showing a structure of a netpage tag.

One embodiment of the physical representation of the tag, shown in FIG. 4a and described in our earlier application U.S. Ser. No. 09/575,129, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges. The fifteen 4-bit data symbols of each of the six codewords are allocated to the four concentric symbol rings 18a to 18d in interleaved fashion. Symbols are allocated alternately in circular progression around the tag. The interleaving is designed to maximise the average spatial distance between any two symbols of the same codeword.

Figure 4B:
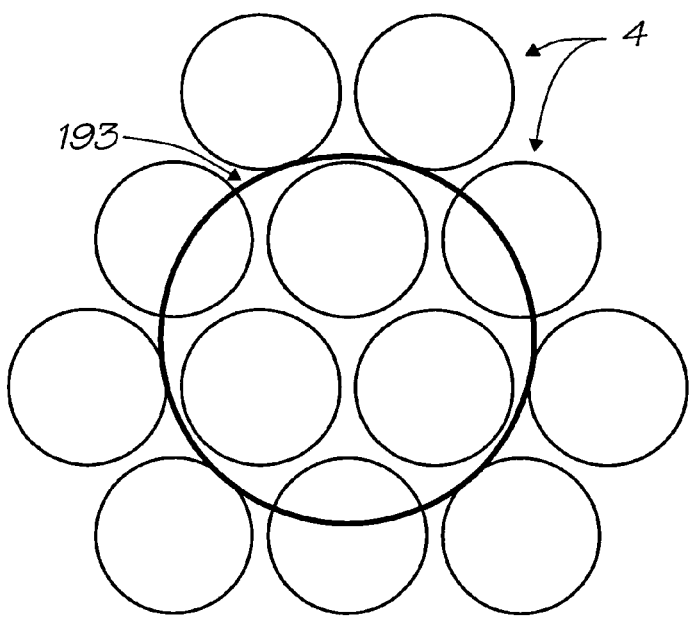
FIG. 4b is a plan view showing a relationship between a set of the tags shown in FIG. 4a and a field of view of a netpage sensing device in the form of a netpage pen.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags. Assuming a circular tag shape, the minimum diameter of the sensor field of view 193 is obtained when the tags are tiled on a equilateral triangular grid, as shown in FIG. 4b.

The tag structure just described is designed to allow both regular tilings of planar surfaces and irregular tilings of non-planar surfaces. Regular tilings are not, in general, possible on non-planar surfaces. In the more usual case of planar surfaces where regular tilings of tags are possible, i.e. surfaces such as sheets of paper and the like, more efficient tag structures can be used which exploit the regular nature of the tiling.

Figure 5A:
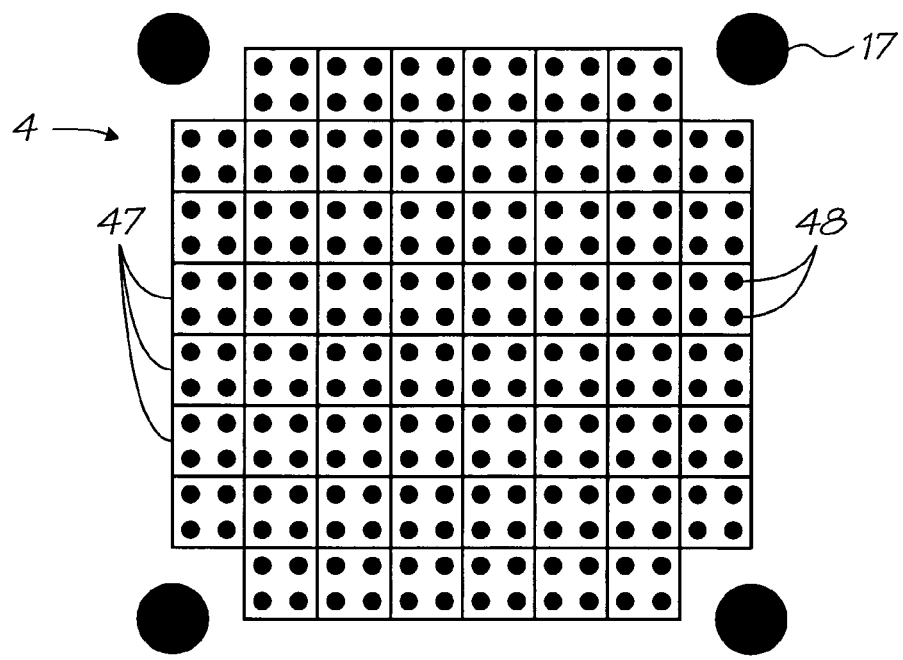
FIG. 5a is a plan view showing an alternative structure of a netpage tag.
Figure 5B:
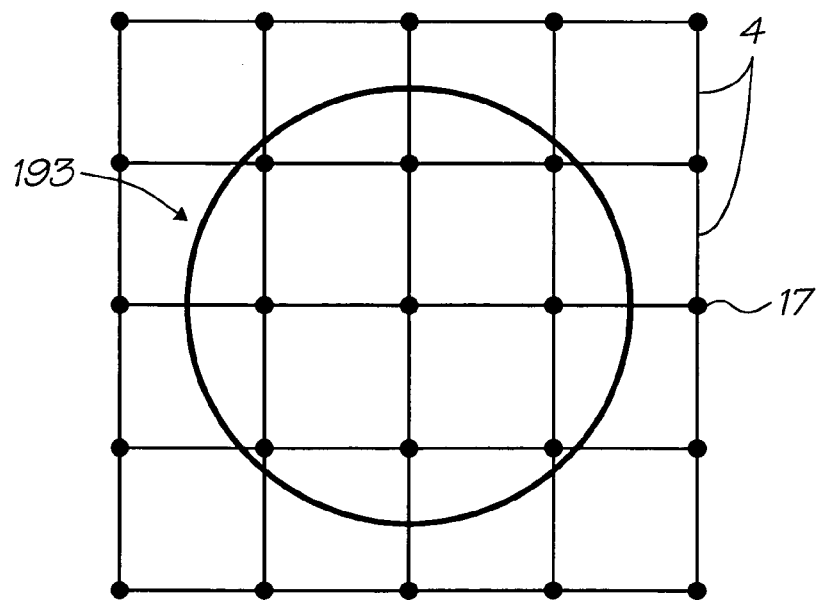
FIG. 5b is a plan view showing a relationship between a set of the tags shown in FIG. 5a and a field of view of a netpage sensing device in the form of a netpage pen.
Figures 5C, 5D:
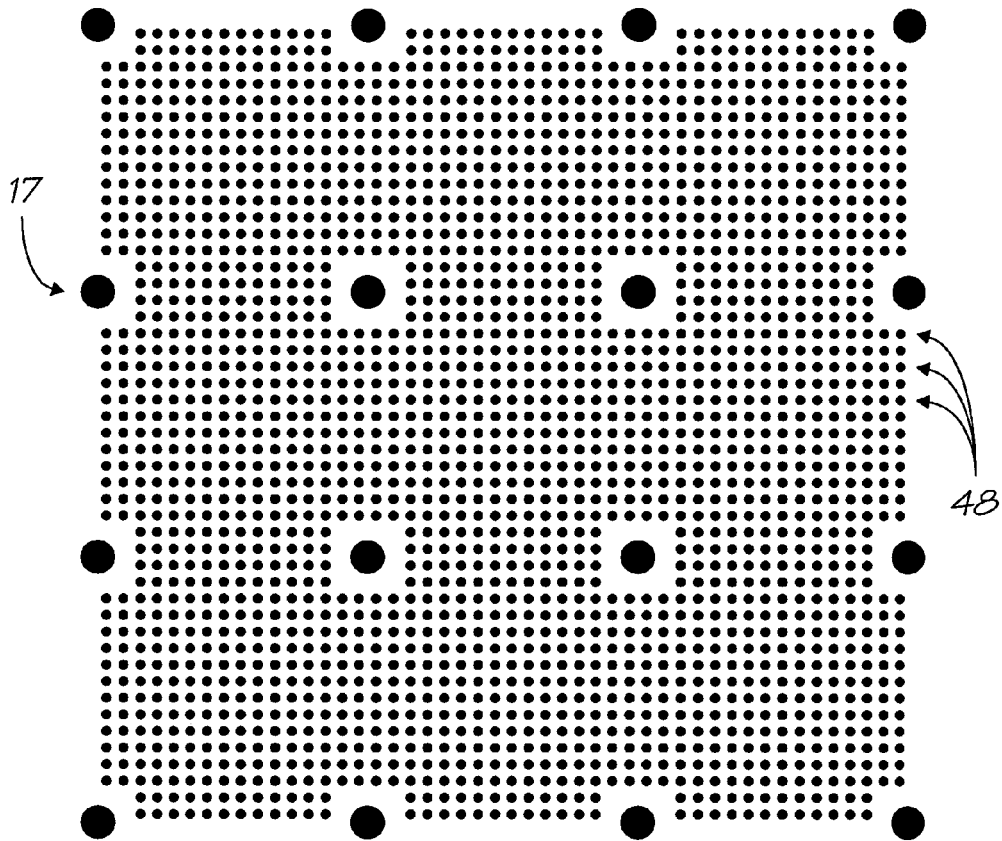

An alternative tag structure more suited to a regular tiling is shown in FIG. 5a. The tag 4 is square and has four perspective targets 17. It is similar in structure to tags described by Bennett et al. in U.S. Pat. No. 5,051,746. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 5b and 5c. FIG. 5b shows a square tiling of 16 tags and the corresponding minimum field of view 193, which must span the diagonals of two tags. FIG. 5c shows a square tiling of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits. The data-bearing dots 48 of the tag are designed to not overlap their neighbors, so that groups of tags cannot produce structures which resemble targets. This also saves ink. The perspective targets therefore allow detection of the tag, so further targets are not required.

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 5d, where each symbol is labelled with the number of its codeword (1-4) and the position of the symbol within the codeword (A-O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. A tag map reflects the scheme used to tile the surface region with tags, and this can vary according to surface type. When multiple tagged regions share the same tiling scheme and the same tag numbering scheme, they can also share the same tag map. The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encoded cartesian coordinates or polar coordinates, depending on the surface type on which it appears. The tag ID structure is dictated by and known to the tag map, and tag IDs associated with different tag maps may therefore have different structures.

Two distinct surface coding schemes are of interest, both of which use the tag structure described earlier in this section. The preferred coding scheme uses "location-indicating" tags as already discussed. An alternative coding scheme uses "object-indicating" (or "function-indicating") tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating (or function-indicating) tag contains a tag ID which directly identifies a user interface element in the page description associated with the region (or equivalently, a function). All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined. As an alternative, the netpage pen 101 can contain a pair or motion-sensing accelerometers, as described in our earlier application U.S. Ser. No. 09/575,174.

With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

Each application user interface flow is illustrated as a collection of documents linked by command arrows. A command arrow indicates that the target document is printed as a result of the user pressing the corresponding command button on the source page. Some command arrows are labelled with multiple commands separated by slashes ('/'s), indicating that any one of the specified commands causes the target document to be printed. Although multiple commands may label the same command arrow, they typically have different side-effects.

Figures 6, 7:
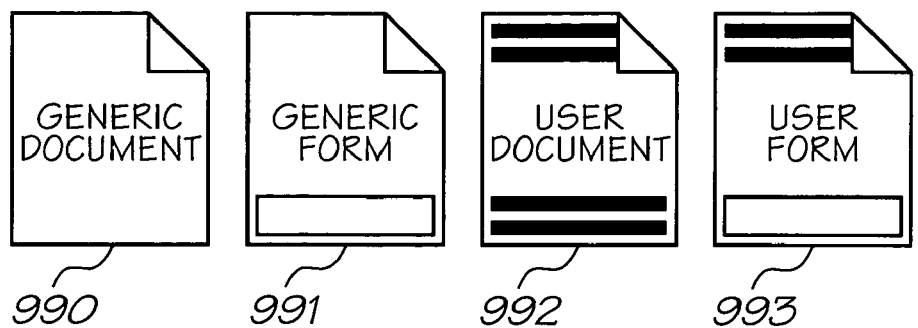
FIG. 6 is a schematic view of a set of user interface flow document icons.
FIG. 7 is a schematic view of a set of user interface page layout element icons.

In application terms, it is important to distinguish between netpage documents and netpage forms. Documents contain printed information, as well as command buttons which can be pressed by the user to request further information or some other action. Forms, in addition to behaving like normal documents, also contain input fields which can be filled in by the user. They provide the system with a data input mechanism. It is also useful to distinguish between documents which contain generic information and documents which contain information specific to a particular interaction between the user and an application. Generic documents may be pre-printed publications such as magazines sold at news stands or advertising posters encountered in public places. Forms may also be pre-printed, including, for example, subscription forms encountered in pre-printed publications. They may, of course, also be generated on-the-fly by a netpage printer in response to user requests. User-specific documents and forms are normally generated on the fly by a netpage printer in response to user requests. FIG. 6 shows a generic document 990, a generic form 991, a user-specific document 992, and a user-specific form 993.

Netpages which participate in a user interface flow are further described by abstract page layouts. A page layout may contain various kinds of elements, each of which has a unique style to differentiate it from the others. As shown in FIG. 7, these include fixed information 994, variable information 995, input fields 996, command buttons 997, draggable commands 998, and text hyperlinks or hypertext links 999.

When a user interface flow is broken up into multiple diagrams, any document which is duplicated is shown with dashed outlines in all but the main diagram which defines it.

Providing Insurance Services Using the Netpage System

The netpage system then, provides the facility for insurance providers to offer products and services to customers. These insurance services include obtaining information about insurance products, obtaining insurance quotes, entering into new policies with customers, making an insurance claim and enabling payment on new or existing policies.

Insurance Services Object Model

The Insurance Services Object Model revolves around products, quotes, insurance policies and payments.

Figure 8:
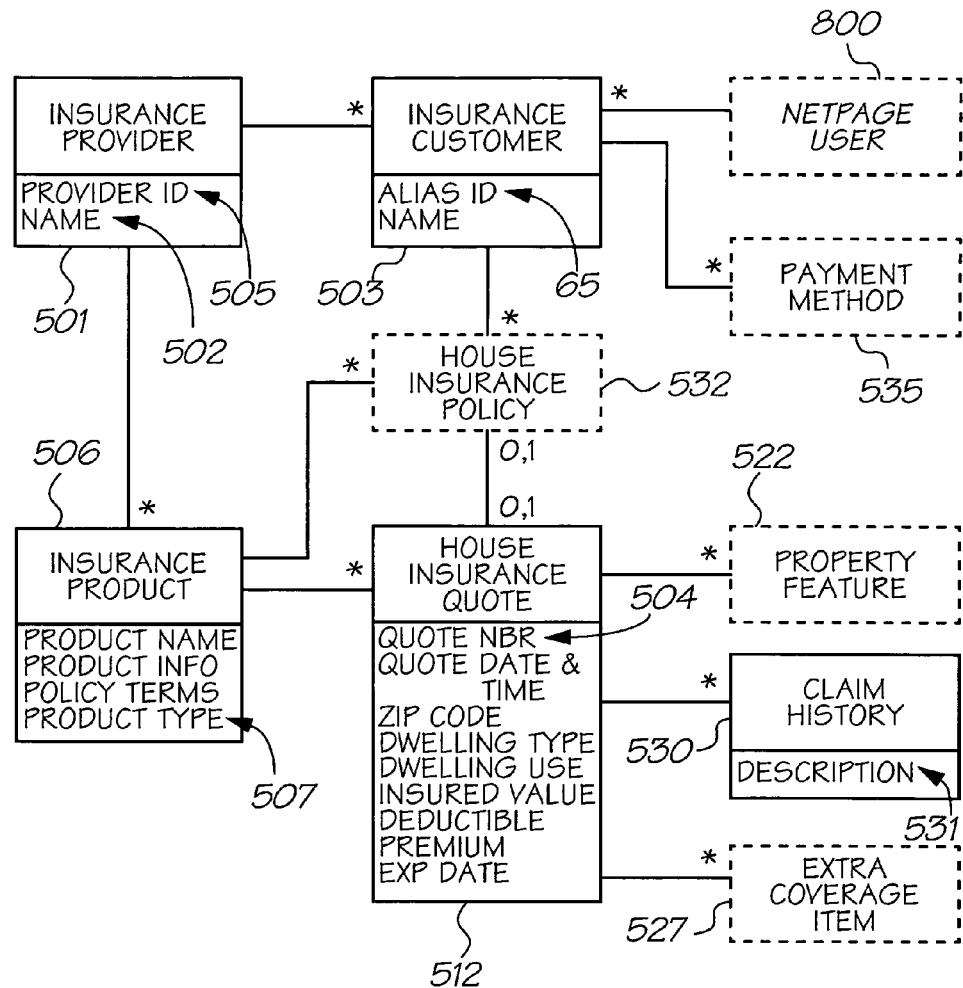
FIG. 8 is a schematic view of an insurance provider class diagram.
Figure 9:
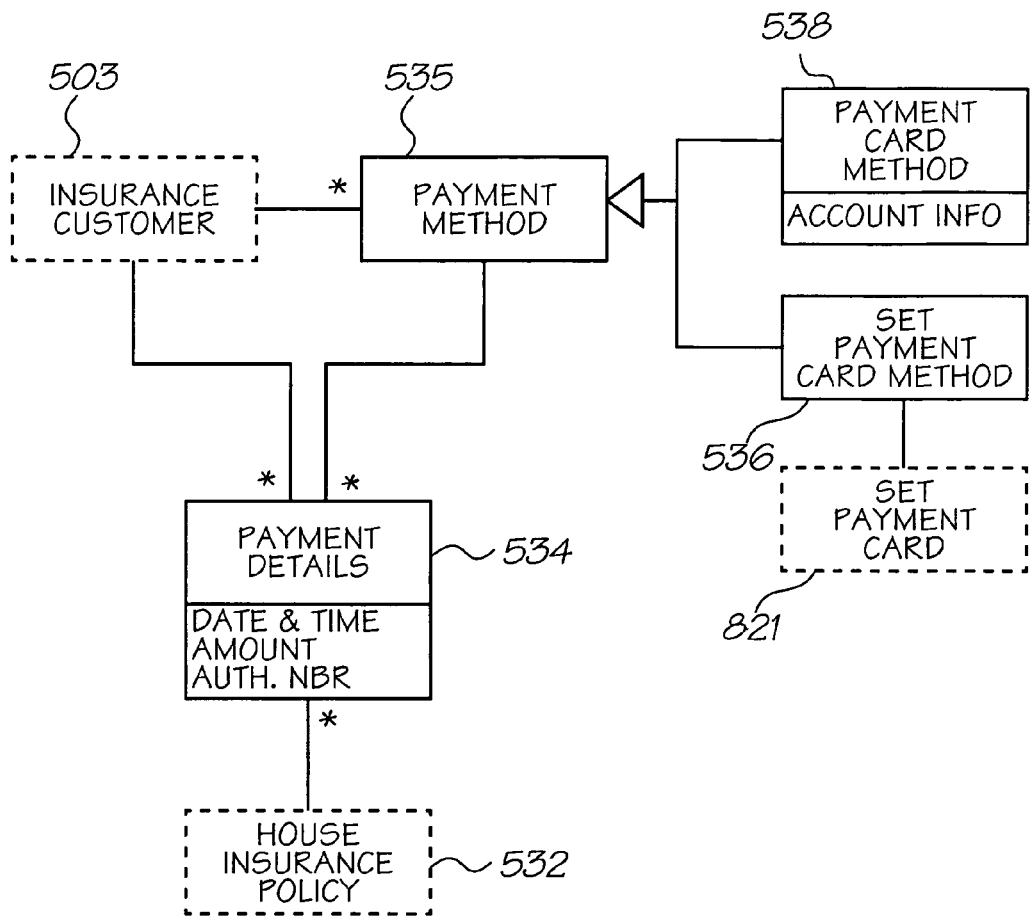
FIG. 9 is a schematic view of a payment method of class diagram.

Turning firstly to FIG. 8, an Insurance Services provider class diagram is shown. Its insurance provider 501 has the unique provider identifier 505 and name 502 and has a number of insurance customers 503. Each insurance customer has an alias identifier 65 which is unique within the scope of the insurance provider 501. Each insurance customer 503 represents a particular netpage user 800 to the provider. A netpage user, on the other hand, can be an insurance customer of any number of providers.

Figure 10:
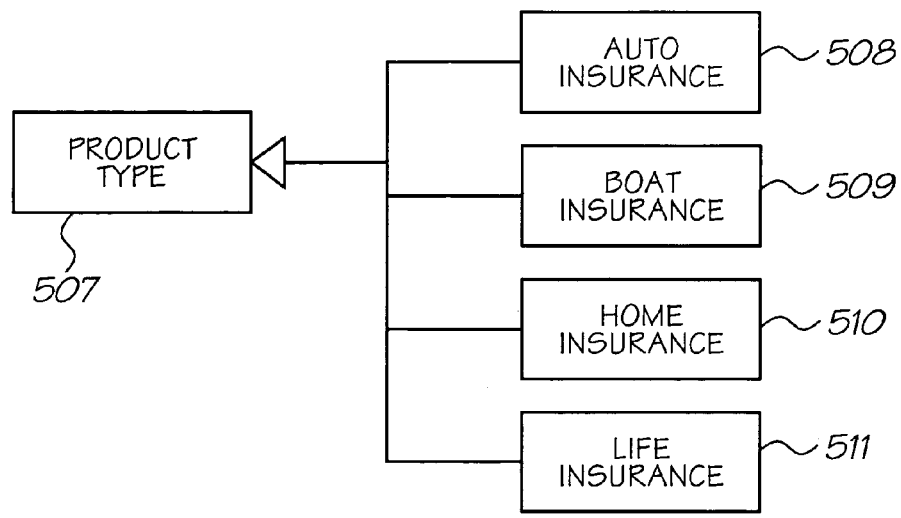
FIG. 10 is a schematic view of a product type class diagram.

An insurance provider 501 may have a number of insurance products 506 each with a product name, product information, policy terms, and a product type 507. Product types 507 include typically auto insurance 508, boat insurance 509, home insurance 510, and life insurance 511, as illustrated in the Product Type class diagram in FIG. 10. An example of different product names of type home insurance may be house (building) insurance, home and contents insurance, and domestic workers insurance.

Figure 13:
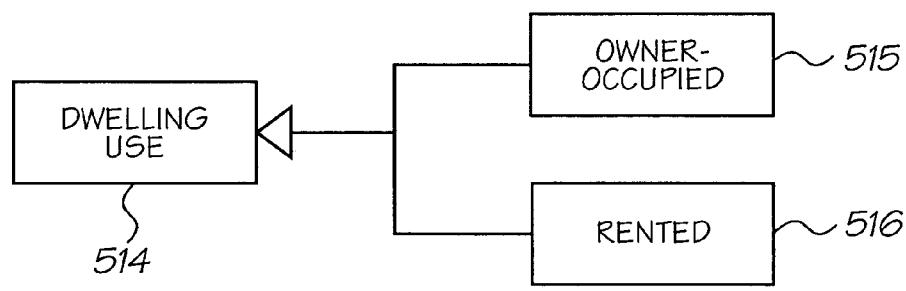
FIG. 13 is a schematic view of a dwelling use class diagram.
Figure 14:
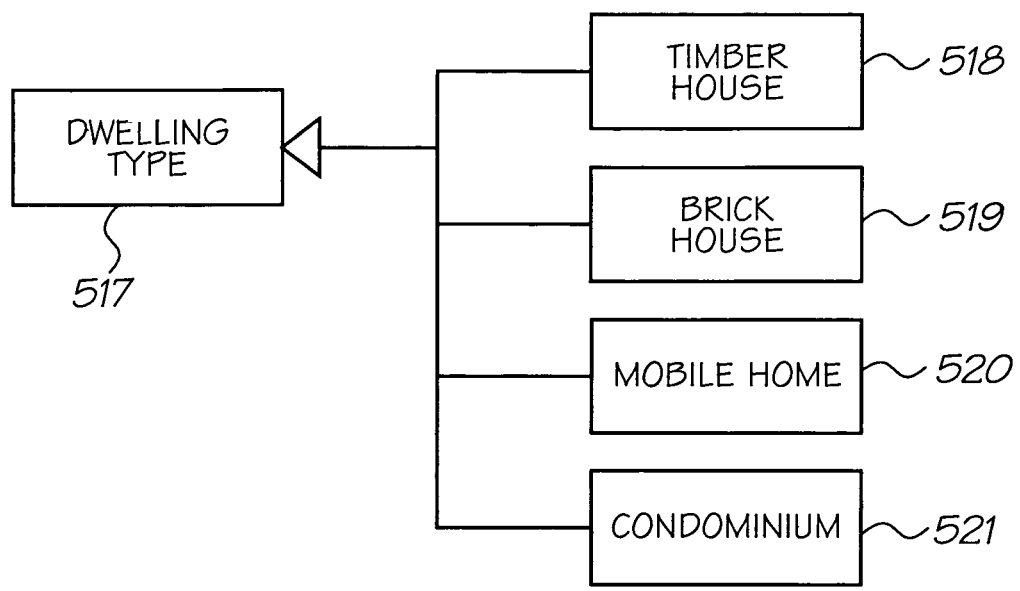
FIG. 14 is a schematic view of a dwelling type class diagram.

Associated with each insurance product 506 is a number of quotes. In the given example in FIG. 46, a house insurance quote 512 a quote number 504, the date and time the quote was issued, ZIP code of the house being insured, dwelling type, dwelling use, insured value, the deductible, the quoted premium and the quoted expiry date. For example, the dwelling use 514 may be owner occupied 515 or rented 516, as illustrated in the class diagram in FIG. 13 whilst the dwelling type 517 may be a timber house 518, a brick house 519, a mobile home 520 or a condominium 521 as illustrated in the dwelling type class diagram in FIG. 14.

Figure 11:
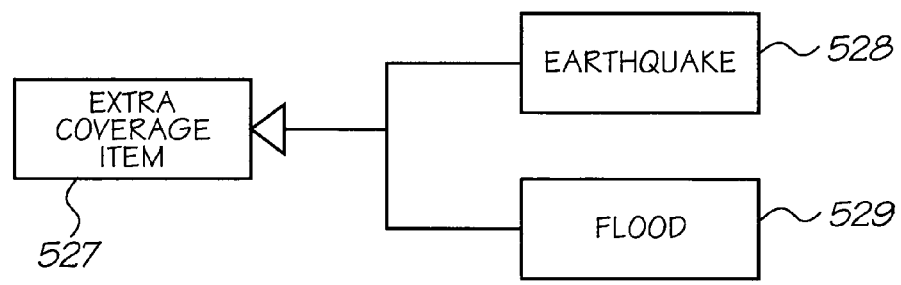
FIG. 11 is a schematic view of an extra coverage item class diagram.
Figure 12:
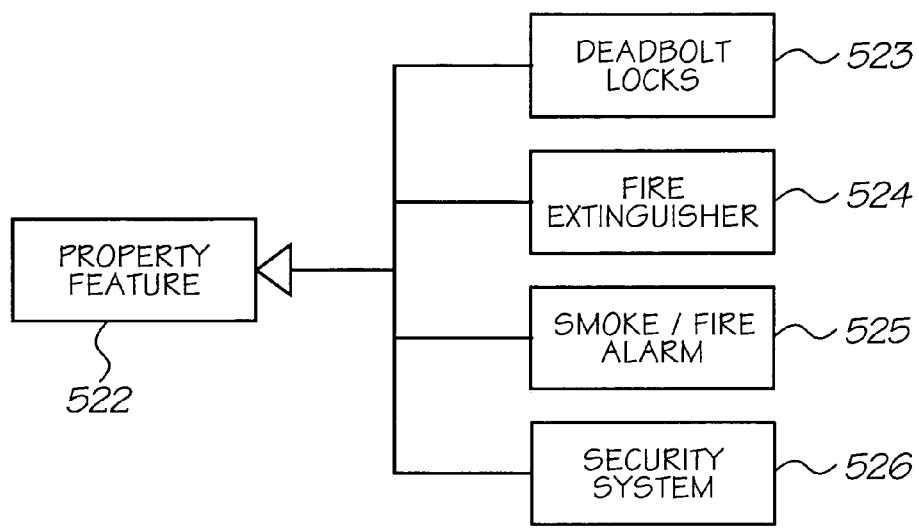
FIG. 12 is a schematic view of a property feature class diagram.

Each house insurance quote 512 may include a number of property features such as those illustrated in the class diagram of FIG. 12 where the property features 522 include deadbolt locks 523, fire extinguishers 524, smoke or fire alarms 525, or security systems 526. A quote may also include a claim history giving a description of any previous house insurance claims. Associated with each quote may be a number of extra coverage items such as those illustrated in the class diagram of FIG. 11 where the extra coverage items 527 include earthquake coverage 528 and flood coverage 529.

A user can request a quote for an insurance product anonymously. The user need not be a registered customer of the insurance provider 501 to obtain a quote, however the user must register to purchase an insurance policy 532. When the user registers as an insurance customer 503, their name and description derives from the details of the corresponding netpage user 800.

Figure 15:
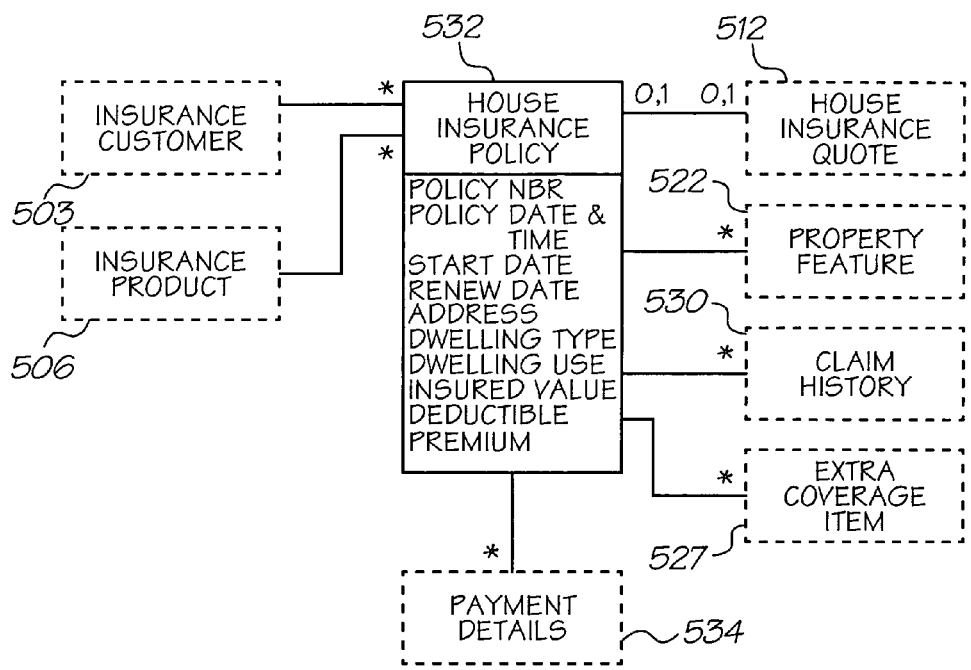
FIG. 15 is a schematic view of a house insurance policy class diagram.

The user may choose to purchase an insurance policy 532 based on the quote. FIG. 15 discloses a House Insurance Policy class diagram. The insurance policy 532 includes details such as the policy number, the date and time the policy was issued, the policy start date and renewal date, the address of the dwelling being insured, the dwelling type and the dwelling use, the insured value, the deductible and the policy premium. A policy 532 also has a number of property features 522, claim history 530, and extra coverage items 527.

Each policy 532 has payment details 534 associated with it, and each payment details include a payment method 535. The payment details 534 include the date and time of the payment, the amount, and the authorisation number. A customer 503 has a set of payment methods 535 from which they can choose when paying an insurance policy. The most common of the many possible payment methods are shown in the Payment Method class diagram illustrated in FIG. 47.

When the SET payment card payment method 536 is used, the corresponding SET payment card 821 which is linked to the user is employed to make the payment according to the normal SET protocol.

With the payment card payment method 538, the specified payment card is used to make payment according to the normal protocol between the merchant, in this case the insurance provider, and their acquiring bank or institution which handles the particular payment card type.

The set of payment methods supported by a particular insurance provider 501 is specific to that provider, and may be different for different customers depending on their credit ratings etc.

Insurance Services User Interface

The netpage user may obtain the Insurance main page 539 (FIG. 20) from a variety of links including:

an advertisement;

the netpage directory (i.e. via the printer's help menu 46);

the netpage user's own bookmark.

Figure 16:
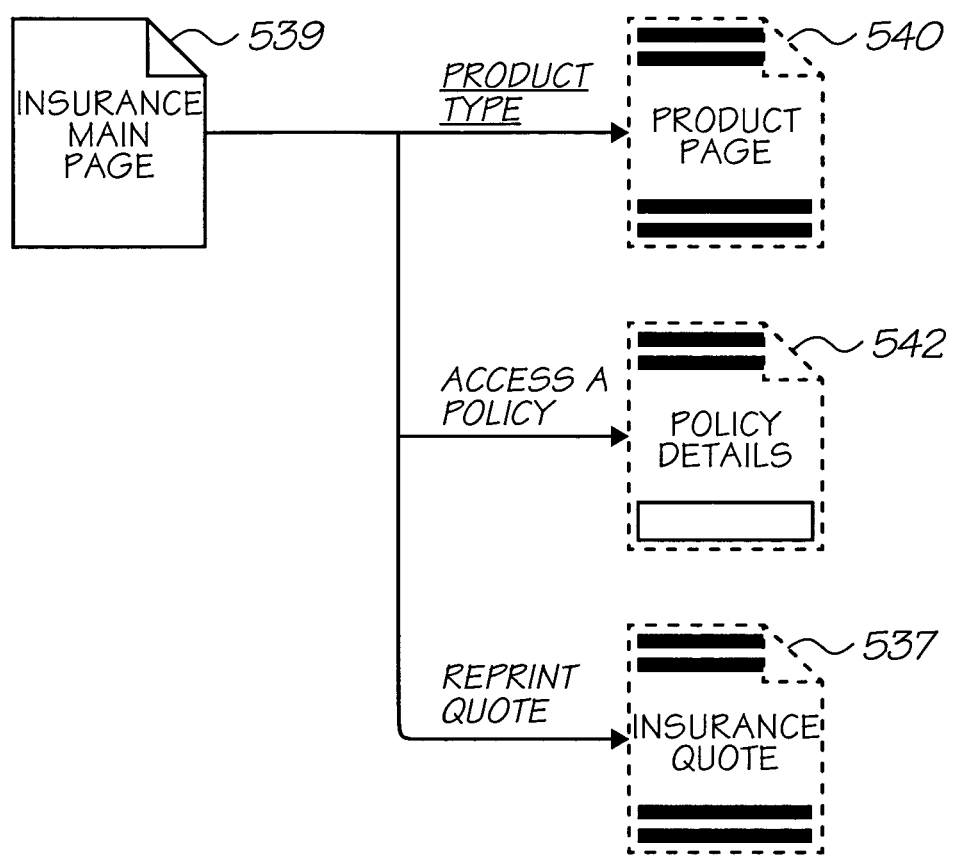
FIG. 16 is a schematic view of an insurance main page user interface flow.

The Insurance Main Page user interface flow is shown in FIG. 16.

Insurance Main Page

Figure 20:
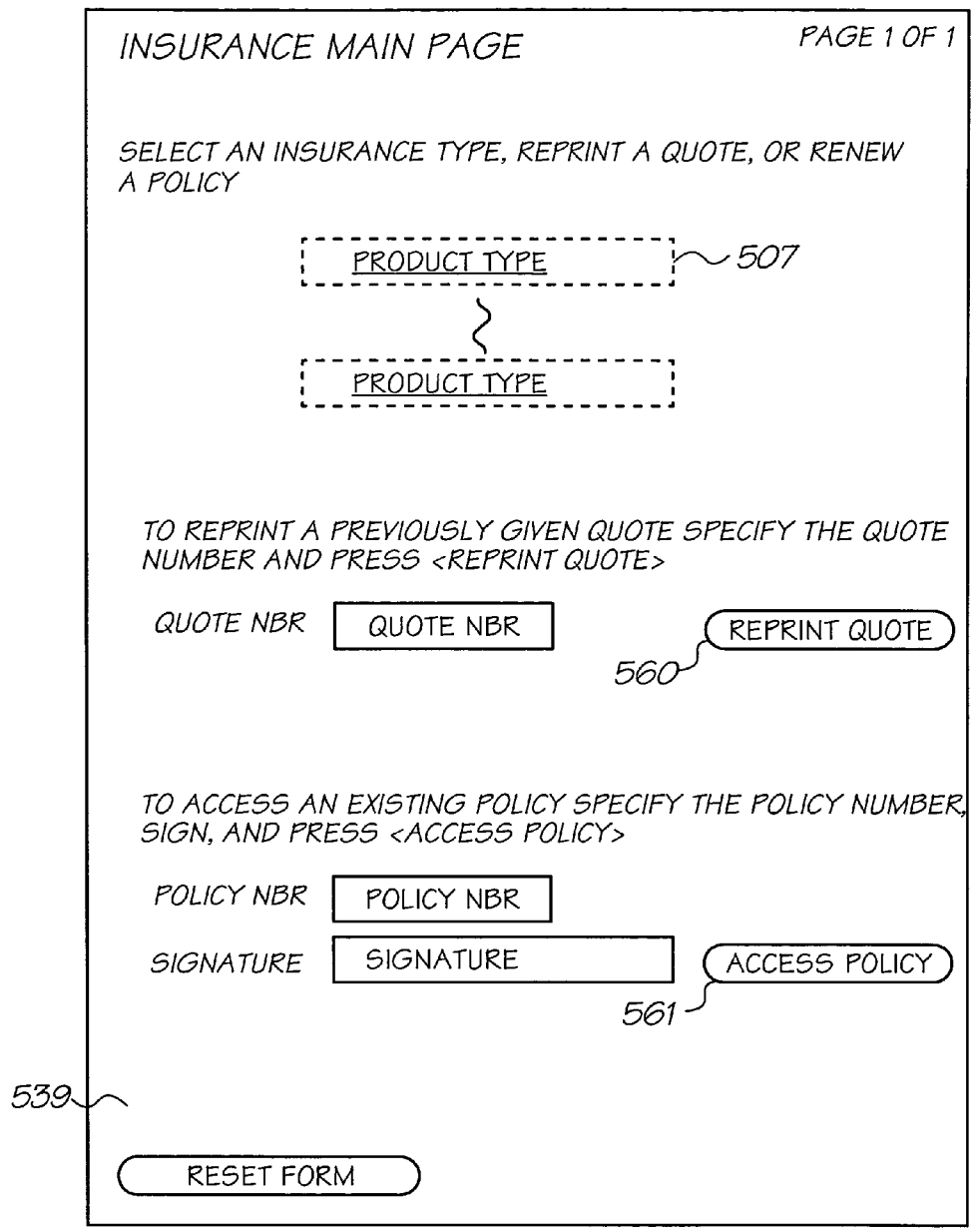
FIG. 20 is a schematic view of an insurance main page.

The Insurance main page 539 is shown in FIG. 20 and allows the user to select an insurance product type 507, reprint a previously-issued quote or access an existing policy.

Figure 21:
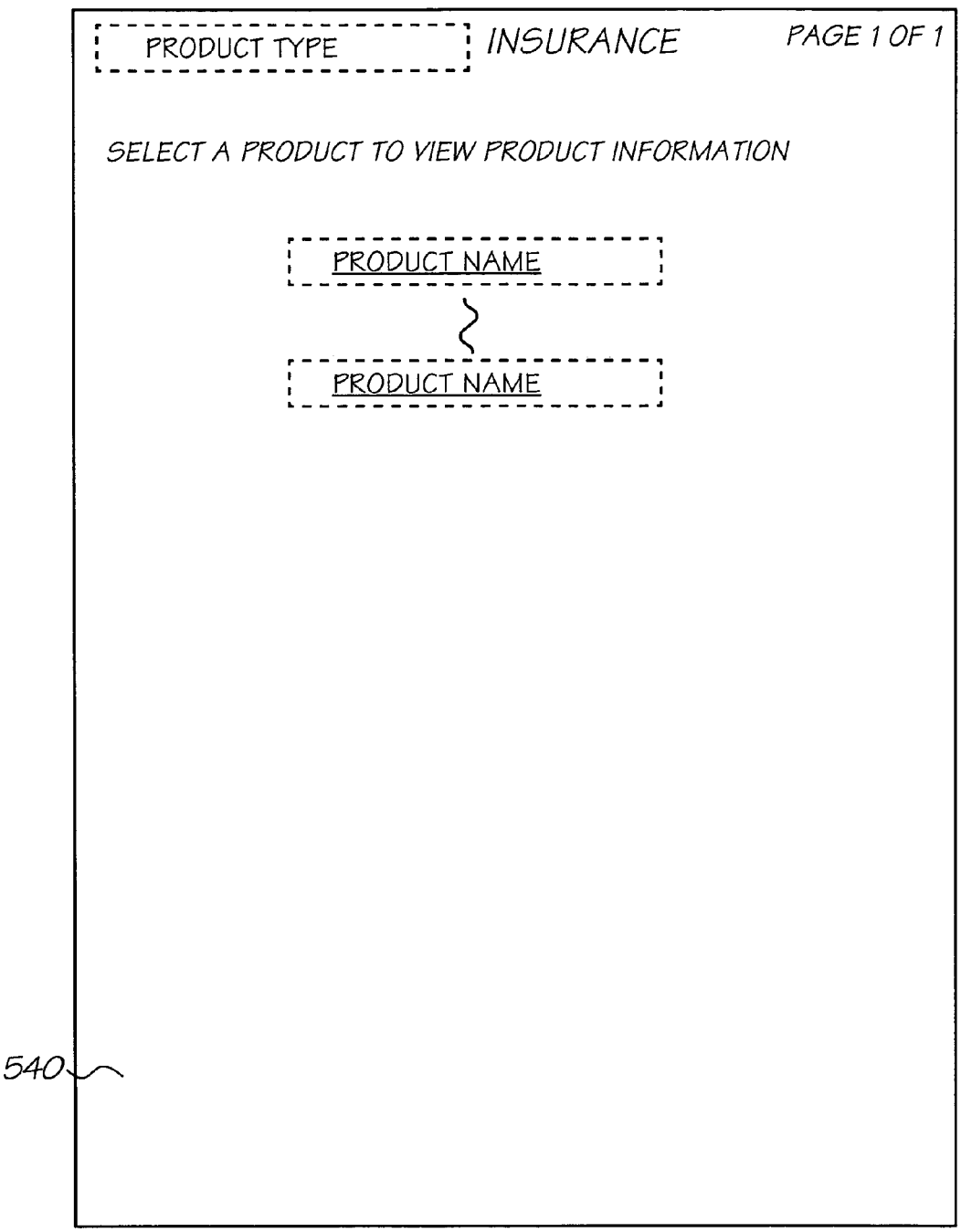
FIG. 21 is a schematic view of an insurance product page.

If the user clicks on a product type 507, a Product page 540 is printed, shown in FIG. 21.

To reprint a previously-issued quote, the user specifies the quote number and presses <Reprint Quote> 560. An Insurance Quote page 537 is then printed and an example of a House Insurance Quote page 541 is shown in FIG. 26.

To access an existing policy, the user specifies the policy number, signs the form with their netpage pen, and presses <Access Policy> 561. The user's signature is verified from netpage records, a Policy Details page 542 is printed, as shown in FIG. 23.

The Insurance Main Page user interface flow is shown in FIG. 16 showing the Product page 540, the Policy Details 542, and the Insurance Quote 537.

Policy Details

Figure 17:
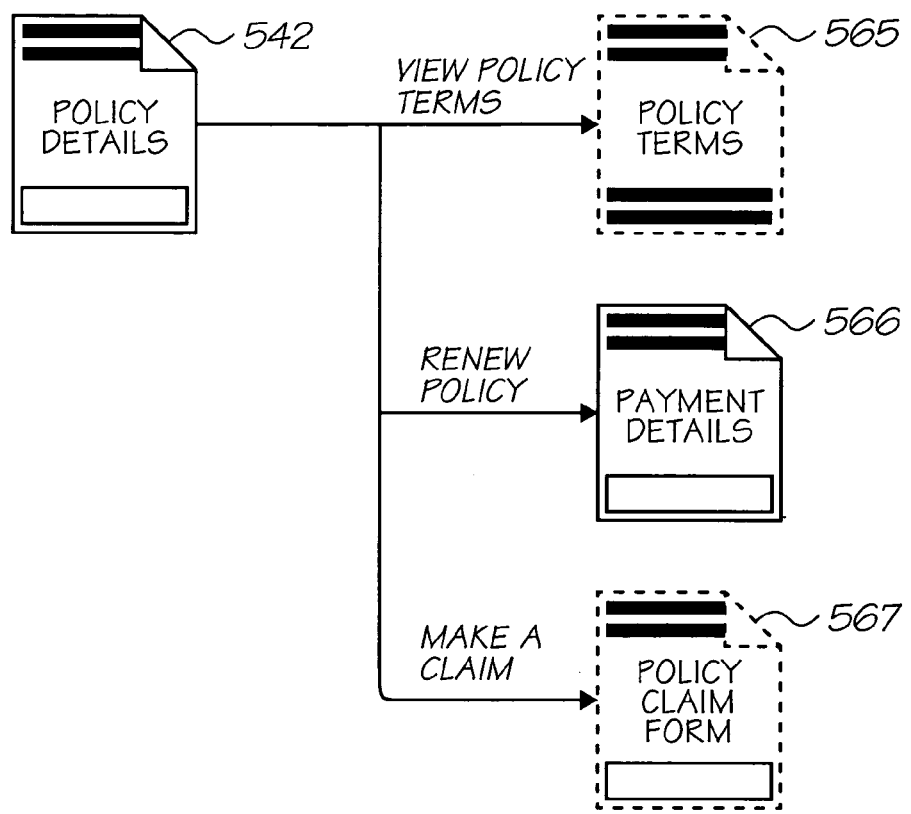
FIG. 17 is a schematic view of a policy access user interface flow.
Figure 18:
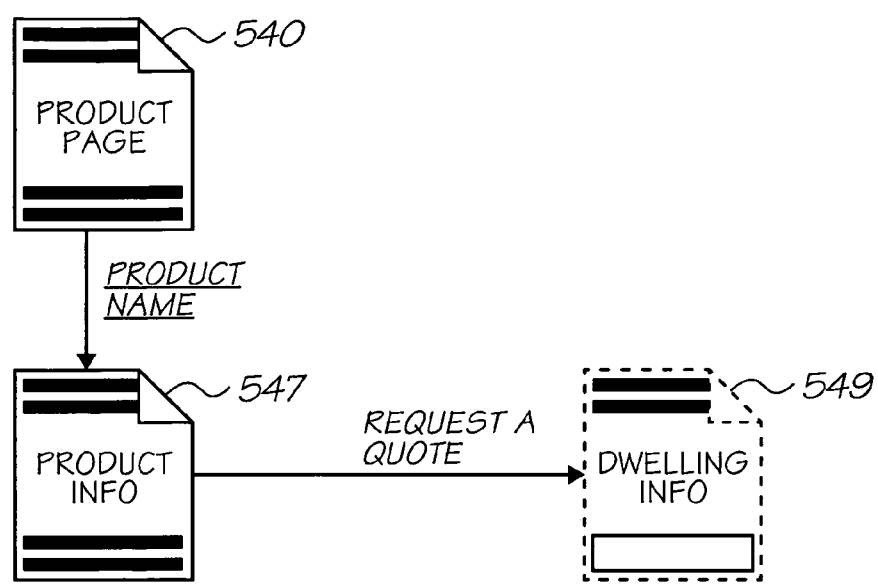
FIG. 18 is a schematic view of an insurance product user interface flow.
Figure 19:
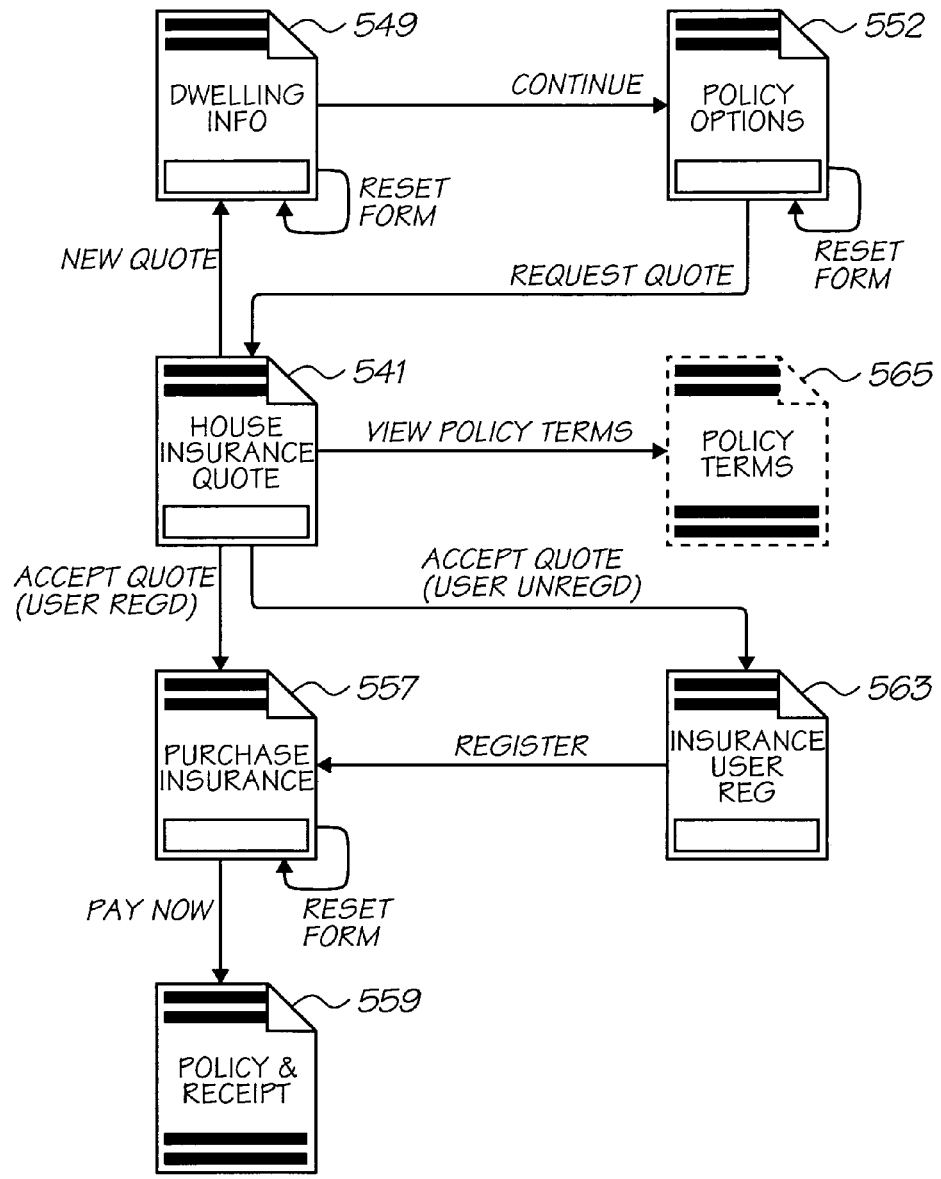
FIG. 19 is a schematic view of a house insurance quote user interface flow.

The Policy Access user interface flow is shown in FIG. 17 showing the Policy Terms page 565, the Payment Details page 566, and the Policy Claim form 567. The content of these pages varies depending on the insurance product 506. The specific example of house insurance is used to further illustrate this application.

The House Insurance Policy Details page 542 as shown in FIG. 23 shows details of an existing house insurance policy. The user can print the terms of the insurance policy by pressing the <View Policy Terms> button 544.

The user can renew the policy by pressing the <Renew Policy> button 545. A payment details page 566 is printed to enable the payment of the renewal.

The user can make a claim on a policy by pressing the <Make A Claim> button 546. A Claim Form is printed which the user can complete and submit to the insurance provider.

Obtaining a Quote

Figure 22:
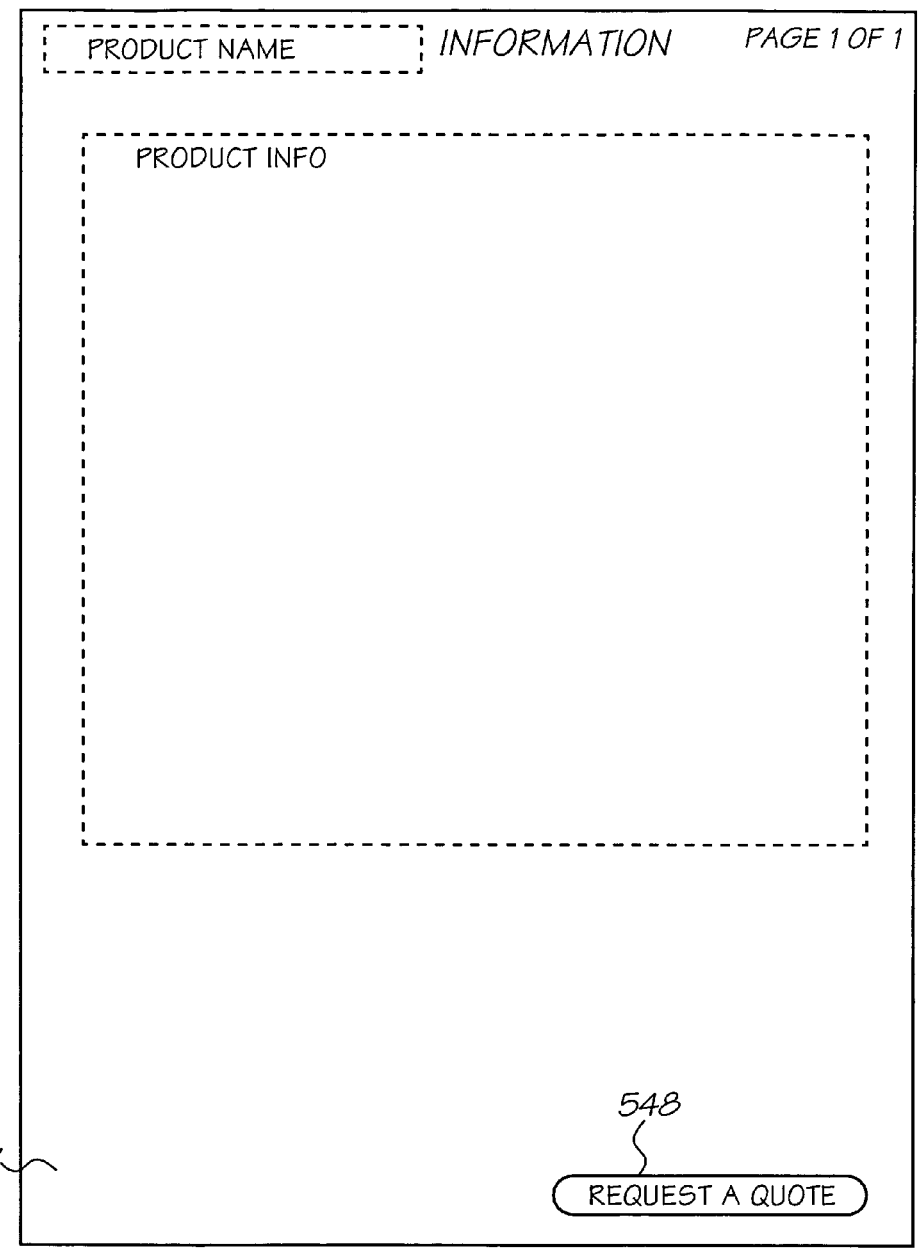
FIG. 22 is a schematic view of a product information page.

When the user selects a product type 507 from the Insurance main page 539, the Insurance Product page 540, shown in FIG. 21, is printed showing a list of all the products 506 of the selected product type. The user clicks on the desired product and a Product Information page 547 is printed, as shown in FIG. 22.

The user can request a quote for this product by pressing <Request A Quote> button 548. A quote request form for the product is printed. In the case of house insurance, a Dwelling Information page 549 is printed as shown in FIG. 24.

On the Dwelling Information page 549, the user completes details of the dwelling type, dwelling use, features of the dwelling, the zip code of the dwelling, and the desired insurance value of the dwelling. If the user presses <Reset Form> 550 a blank Dwelling Information form 549 is printed. The user presses <Continue> 551 to go to the next step of requesting a quotation. A Policy Options form 552 is printed as shown in FIG. 25.

On the Policy Options form the user specifies extra coverage items, the desired deductible in the event of a claim, and any relevant previous claim history 530. If the user presses <Reset Form> 562 a blank Policy Options form 552 is printed. When the details are completed, the user presses <Request Quote> 553. A House Insurance Quote page 541 is printed as shown in FIG. 26.

The House Insurance Quote page 541 shows the information entered by the user (and used by the insurer in calculating the premium), the quoted premium, and the quote expiry date. The user can print the terms of the insurance policy by pressing the <View Policy Terms> button 554.

If the user wishes to accept the quotation and purchase the insurance policy they sign the form and press <Accept Quote> 555. The user is identified by the netpage pen they are using and the signature is verified from netpage records.

If the user wishes to obtain a new quote, they press the <New Quote> button 556 and a blank Dwelling Information form 549 is printed.

Purchasing Insurance

As indicated above, a netpage user may obtain insurance quotes without being identified to the insurance provider 501, however the user must be registered as a customer 503 of the insurance provider before purchasing a policy.

If the user presses <Accept Quote> 555 on the House Insurance Quote page 541 (FIG. 26) and the user is already a registered customer 503 of the insurance provider 501, a Purchase Insurance form 557 is printed as shown in FIG. 27.

If the user is not registered with the provider, an Insurance User Registration form 563 is printed. This form is generated by the netpage registration server. When the user completes the registration, the Purchase Insurance form 557 is printed.

The Purchase Insurance form 557 shows the quote number, the dwelling insured value, and the insurance premium. The user completes the address of the dwelling being insured, and the payment method. If the user has a history of payment methods with the insurer, these payment methods will be listed and the user can select one. Alternatively, the user can enter details of a new payment card. The user signs the form and presses the <Pay Now> button 558. A Policy and Receipt page 559 is then printed as illustrated in FIG. 28.

The user's signature is verified from netpage records. If the user chooses to use the secure electronic transaction (SET) payment mechanism built into the netpage system, the user's payment card details are never revealed to the insurance provider.

CONCLUSION

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A method of providing insurance services, said method comprising the steps of:
   providing a paper form having information relating to an insurance service and a plurality of tags printed thereon, each tag containing coded data indicative of an identity of the paper form and of the tag's own location on the paper form,
   operatively positioning an optical sensing device relative to the paper form;
   sensing at least some of the coded data;
   generating indicating data in the sensing device using the sensed coded data, indicating data regarding the identity of the form paper form and a position of the sensing device relative to the form paper; and
   sending the indicating data to computer system, such that the computer system can identify, using the indicating data, at least one parameter relating to the insurance service;
   wherein at least one parameter is an action parameter of the insurance service,
   the method including effecting, in the computer system, an operation in respect of the action parameter; and
   wherein the action parameter of the insurance service is selected from the group comprising: obtaining insurance product information; obtaining details of an insurance policy; obtaining a quote for insurance; making an insurance claim; viewing the terms of an insurance policy; accepting the terms of an insurance policy; and making payment for an insurance policy.

2. The method of claim 1 in which said at least one parameter relating to the insurance service is associated with at least one zone of the paper form and in which the method includes identifying, in the computer system and from the zone relative to which the sensing device is located, said at least one parameter.

3. The method of claim 2 which includes:
   the sensing device sensing its movement relative to the paper form using at least some of the coded data;
   sending, to the computer system, data regarding movement of the sensing device relative to the paper form; and
   identifying, in the computer system and from said movement being at least partially within said at least one zone, said at least one parameter of the insurance service.

4. The method of claim 1, further comprising the step of:
   receiving, in the computer system, data from the sensing device regarding movement of the sensing device relative to the paper form; and
   interpreting, in the computer system, said movement of the sensing device as it relates to said at least one parameter.

5. The method of claim 1, further comprising the step of:
   sending, to the computer system, data from the sensing device regarding an identity of a customer, such that the computer system can identify the identity of the customer and provide the insurance service as it relates to that customer.

6. The method of claim 3 in which the parameter is an option parameter of the insurance service, the method including identifying, in the computer system, that a customer has entered a hand-drawn mark by means of the sensing device and effecting, in the computer system, an operation associated with the option parameter.

7. The method of claim 6 in which the option parameter is associated with at least one of:
   an insurance product type;
   a payment method;
   a card type;
   extra coverage items;
   a deductible;
   a dwelling type;
   a dwelling use;
   a dwelling feature; or
   a property feature.

8. The method of claim 3 in which the parameter is a text parameter of the insurance service, the method including identifying, in the computer system, that a customer has entered handwritten text data by means of the sensing device and effecting, in the computer system, an operation associated with the text parameter.

9. The method of claim 8 which includes converting, in the computer system, the handwritten text data to computer text.

10. The method of claim 9 in which the text parameter is associated with at least one of:
    a quote number;
    a policy number;
    a zip code;
    an insured value;
    insurance claim history;
    a property address; and
    payment card details.

11. The method of claim 3 in which the parameter is an authorisation parameter of the insurance service, the method including identifying, in the computer system, that a customer has entered a handwritten signature by means of the sensing device and effecting, in the computer system, an operation associated with the authorisation parameter.

12. The method of claim 11 which includes verifying, in the computer system, that the signature is that of the customer.

13. The method of claim 12 in which the authorisation parameter is associated with at least one of
    insurance policy acceptance, and
    payment authorisation.

14. The method of claim 3 in which the parameter is a picture parameter of the insurance service, the method including identifying, in the computer system, that a customer has entered a hand-drawn picture by means of the sensing device and effecting, in the computer system, an operation associated with the picture parameter.

15. The method of claim 14 in which the picture parameter is associated with an insurance claim.

16. The method of claim 1 in which the paper form contains information relating to at least one of:
   insurance product information;
   insurance policy details;
   an insurance quote;
   insurance policy terms; and
   insurance policy receipt.

17. The method of claim 1, wherein the coded data is substantially invisible in the visible spectrum.

18. The method of claim 1 which includes retaining a retrievable record of each paper form generated, the paper form being retrievable using its identity as contained in its coded data.

19. The method of claim 1 which includes distributing a plurality of the forms using a mixture of multicast and pointcast communications protocols.

20. The method of claim 1 in which the sensing device contains an identification means which imparts a unique identity to the sensing device and identifies it as belonging to a particular customer and in which the method includes monitoring, in the computer system, said identity.

21. The method of claim 1 which includes providing all required information relating to the insurance service in the paper form to eliminate the need for a separate display device.

22. The method of claim 1 in which the paper form is printed on multiple pages.

23. A system for providing insurance services, said system comprising:
   a paper form having information relating to an insurance service and a plurality of tags printed thereon, each tag containing coded data indicative of an identity of the paper form and of the tag's own location on the paper form;
   a sensing device configured for:
      sensing at least some of the coded data when placed in an operative position relative to the paper form;
      generating indicating data, said indicating data regarding the identity of the paper form and a position of the sensing device relative to the paper form; and
      sending the indicating data to a computer system;
   the computer system configured for:
      receiving the indicating data from the sensing device,
      identifying, from the indicating data, at least one parameter relating to the insurance service,
      wherein said at least one parameter of the insurance service is an action parameter of the insurance service and one parameter selected from the group comprising: an option parameter of the insurance service, a text parameter of the insurance service, an authorisation parameter of the insurance service, and a picture parameter of the insurance service;
      the computer system performing one of the following insurance services in respect to the action parameter: obtaining insurance product information; obtaining details of an insurance policy; obtaining a quote for insurance; making an insurance claim; viewing the terms of an insurance policy; accepting the terms of an insurance policy; and making payment for an insurance policy.

24. The system of claim 23 in which said at least one parameter relating to the insurance service is associated with at least one zone of the paper form.

25. The system of claim 23 wherein the sensing device senses its movement relative to the paper form using at least some of the coded data.

26. The system of claim 23, wherein the computer system is further configured for:
   receiving data from the sensing device regarding movement of the sensing device relative to the paper form; and
   interpreting said movement of the sensing device as it relates to said at least one parameter,
wherein the sensing device, when moved relative to the paper form, senses at least some of the coded data and generates the movement data using the sensed coded data.

27. The system of claim 23, wherein the computer further configured for:
   receiving, from the sensing device, data regarding an identity of a customer; and
   identifying, from said received data, an insurance service as it relates to that customer,
wherein the sensing device contains the data regarding the identity of the customer.

28. The system of claim 23 in which the option parameter is associated with at least one of: an insurance product type; a payment method; a card type; extra coverage items; a deductible; a dwelling type; a dwelling use; a dwelling feature; or a property feature.

29. The system of claim 23 in which the text parameter is associated with at least one of: a quote number; a policy number; a zip code; an insured value; insurance claim history; a property address; and payment card details.

30. The system of claim 23 in which the authorisation parameter is associated with at least one of: insurance policy acceptance, and payment authorisation.

31. The system of claim 23 in which the picture parameter is associated with an insurance claim.

32. The system of claim 25 in which the sensing device includes a marking nib.

33. The system of claim 25 or 26 in which the sensing device contains an identification means which imparts a unique identity to the sensing device and identifies it as belonging to a particular customer.

34. The system of claim 23 in which the coded data is substantially invisible in the visible spectrum.

35. The system of claim 23 which includes a database for keeping a retrievable record of each paper form generated, each paper form being retrievable by using its identity as included in its coded data.

36. The system of claim 23, wherein the paper form is printed on multiple pages.

* * * * *